Sept. 28, 1937.                L. WACHTER                 2,094,050
                              CASTER WHEEL
                          Filed March 25, 1936
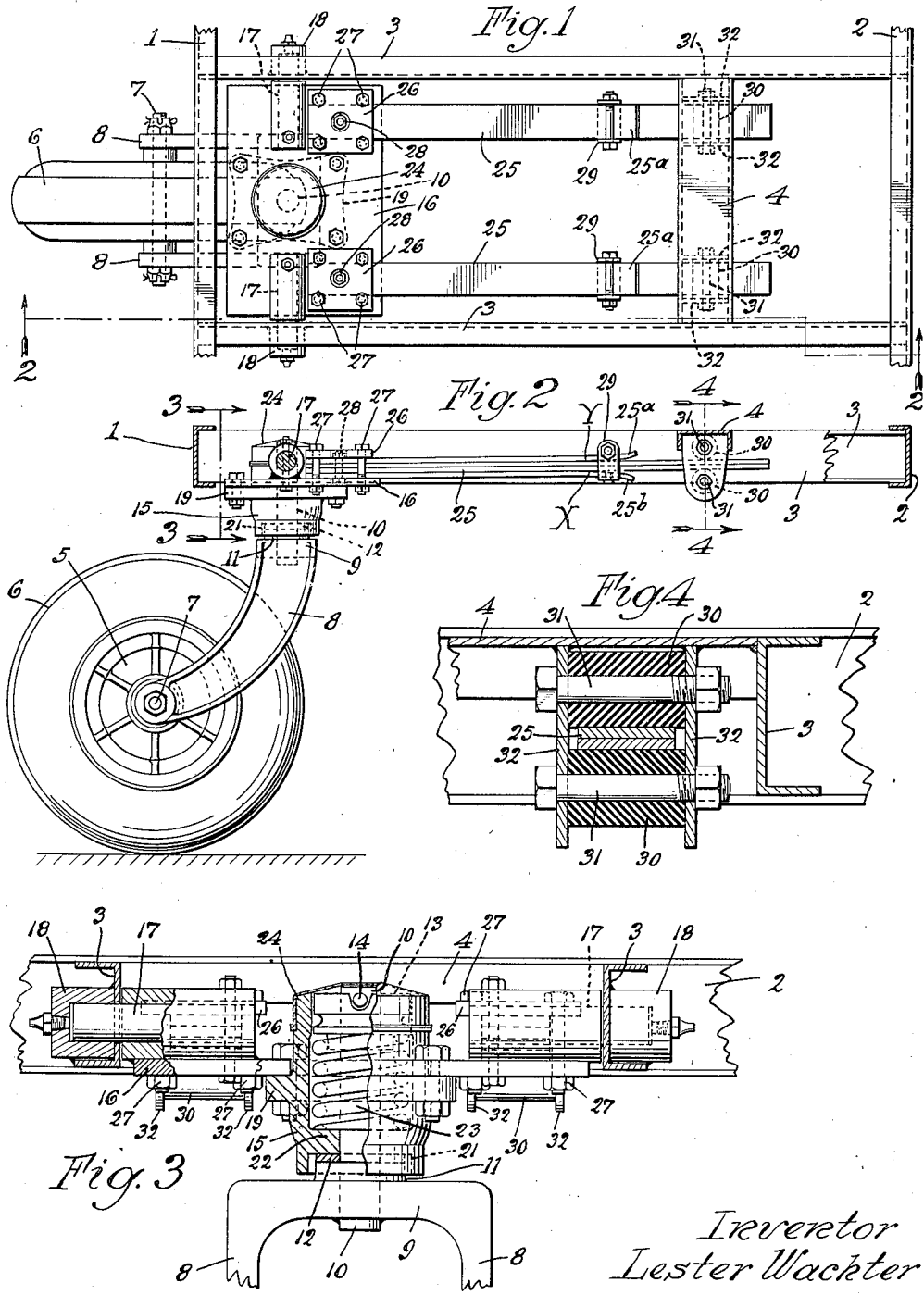
Inventor
Lester Wachter
by Parker + Carter
Attorneys.

Patented Sept. 28, 1937

2,094,050

UNITED STATES PATENT OFFICE 2,094,050

CASTER WHEEL

Lester Wachter, Streator, Ill., assignor to Anthony Development Company, Streator, Ill., a syndicate Application March 25, 1936, Serial No. 70,797

3 Claims. (Cl. 280—33.4)

This invention relates to a running gear, and particularly to a running gear for trailer vehicles, although it is not necessarily limited to that purpose and may be used on any sort of a wheeled vehicle, whether self propelled or otherwise propelled.

In the particular form illustrated it is shown as applied to a single wheeled trailer. Only so much of the frame of the trailer is shown as is necessary to indicate the location and operation of the wheel and its mounting.

An object of the invention is to provide an economical caster mounting for a wheel and to associate therewith a spring support. Another object is to provide a spring support in connection with such a caster wheel so arranged that it balances and supports some of the load but does not support the entire load. Another object is to provide such a spring support which will carry the load properly, irrespective of the direction of movement of the vehicle upon which the wheel is mounted.

Other objects will appear throughout the specification and claims.

The invention is illustrated more or less diagrammatically in the accompanying drawing, wherein:—

Figure 1 is a plan view of a frame of a vehicle, with parts broken away and with parts omitted;

Figure 2 is a longitudinal vertical section taken at line 2—2 of Figure 1;

Figure 3 is a transverse vertical sectional detail taken at line 3—3 of Figure 2 on an enlarged scale;

Figure 4 is a transverse vertical sectional detail taken at line 4—4 of Figure 2, on an enlarged scale.

Like parts are indicated by like characters throughout the specification and drawing.

The vehicle frame may be of any desired construction. As shown, it comprises a rear member 1, a forward member 2 and two longitudinal side members 3 which are joined to the front and rear members. A transverse member 4, preferably of channel section, may be mounted intermediate the front and rear ends and extending between the longitudinal members 3. It serves as a support for the ends of a spring or springs as will be described below.

5 is a wheel which may carry a rubber or other tire 6. The wheel is mounted on a shaft or axle 7 supported in the arms 8 of a fork body 9. A stem 10 extends upwardly from the fork body. In the particular form shown this stem is welded to the body but might, of course, be made integral with it or otherwise secured to it. The upper surface of the caster body is preferably provided with a raised portion 11 which is smoothed on its upper surface and may carry a thrust washer of fiber or other nonabrasive friction material 12. At its upper end the stem or spindle 10 may carry a disc 13 secured to it by a pin 14 or otherwise. 15 is a housing secured to a plate 16 which is supported by means of trunnions 17 in suitable bearings 18 on the frame members 3. Secured to the plate 16 is a flange 19 which is preferably formed integrally with the generally rounded housing member 15. The housing member is formed in its bottom with an open, downwardly facing cup-shaped cavity 21 within which the member 12 is received. A partition 22, formed in the housing, closes its bottom and a compression spring 23 is positioned within the housing about the stem 10, bearing at one end upon the partition 22, at its upper end upon the disc 13. A closure member 24 closes the upper end of the housing and covers the disc 13 and the stem 10. The particular details of the caster arrangement just described are not essential to the present invention. Others might be substituted. It is important, however, that means be provided for supporting the wheel carrying yoke, to permit its rotation about a vertical axis, that is to say, it is important that caster means be provided. It is also important that sufficient friction be provided to prevent wabbling or "shimmying" of the wheel during movement. Any means which will accomplish this may be used and the one illustrated is merely one of many suitable arrangements for this purpose.

Two springs 25 which are preferably generally flat leaf springs, are secured at their thicker ends to the plate 16. A plate 26 is provided for each of the springs and it is held to the plate 16 by bolts or screws 27 or otherwise secured to the plate 16. Bolts 28 may be used to secure the leaves of the springs together.

As shown particularly in Figure 2, the upper leaf 25a and the lower leaf 25b of the springs 25 are curved, respectively, upwardly and downwardly and when free to do so are at their ends to some degree out of contact with the remaining leaves of the spring. A clearance, indicated generally at X and Y of Figure 2 occurs at this point. A clip 29 is positioned about the leaves and adjacent but not at the ends of the upper and lower leaves. This clip holds the leaves in line and prevents undue separation.

Adjacent their outer or free ends the remaining leaves of the springs are engaged between cushion members 30 which may be of rubber or other suitable material and are carried by members 31, supported in webs 32 carried in the cross or transverse member 4. By this construction a movable connection or attachment is provided for the forward end of the springs and the lateral movement of the springs which occurs as a result of flexure of the springs is permitted by this attachment which also cushions vibration and prevents undue wear and noise.

The use and operation of my invention are as follows:

The parts are assembled generally as shown. The thrust of the spring 23 is effective on the disc 13 and thus tends to pull upwardly on the yoke and force the top portion 11 of the yoke against the friction disc 21. The friction thus set up is sufficient to prevent wabbling of the caster trailer in service. In other words, it does not swing from side to side in response to the ordinary road jerks and jolts and trails straight except when a turn is really made. Then the turning effect is sufficient to overcome the friction and cause the yoke and wheel to swing or track as desirable.

Similarly, if the vehicle is backed, the caster swings around, the yoke swings so that it points to the rear of the wheel, then if this backing movement is continued it trails in a reverse position from that shown in Figures 1 and 2. The point is that some form of frictional device should be included in the mounting to avoid jiggling and wabbling and the form illustrated is merely one that is suitable.

Since the mounting for the yoke is supported on a plate which is trunnioned to the trailer or vehicle frame, and since the vertical plane which passes through the trunnions is relatively close to the vertical plane of the point of wheel support, a considerable proportion of the load of the vehicle or trailer is carried by the trunnions and the springs 25 carry some of it because they resist turning of the plate about the trunnions. With the parts in the position of Figures 1 and 2, the weight of the frame is so exerted upon the wheel and the trunnion plate that there is a tendency to flex the springs 25 downwardly. When the vehicle is being backed, the reverse is the case and the tendency is to flex the spring upwardly. In whichever direction flexure occurs, the spring takes up yieldingly some of the load. Since the upper and lower spring leaves are partially at least out of contact with the center spring leaves, when the load is light, the center leaves carry the greater portion of it, because they are the leaves which are in contact with the supports 30, 31. When the load is increased, however, by flexure of the spring either upward or downward, the clearance X or the clearance Y is reduced or disappears entirely and thus one or the other of the spring leaves 25a or 25b comes fully into action and thus the spring is stiffened. This spring construction thus provides an automatic means to compensate for or take up a greater load. The effective stiffness of the spring therefore is increased automatically as it is flexed.

I have spoken of the spring 25. As shown there are two. There might be only one or there might be more than two. The number of springs and their dimensions generally will be varied, dependent upon the load which they are to carry. The invention is not limited to any particular number of springs.

I claim:

1. In combination in a trailer vehicle, a frame, an extended plate member pivoted therein for movement about a fixed, generally horizontal axis, a movable fork depending therefrom, a wheel supported for rotation in said fork, a caster mounting for said fork carried by said plate, friction means in said caster mounting adapted to resist rotation of the fork with respect to the caster mounting, a pair of leaf springs, secured each at one end to said plate, each projecting forwardly therefrom in general alignment with said frame, said springs at their outer or free ends secured to said frame by a movable connection, said springs comprising a plurality of leaves, a minimum number of said leaves being normally in operation, and means on said springs whereby additional leaves come into operation after a predetermined amount of flexure of said first mentioned minimum number of leaves, the movable connection for the outer end of each spring comprising a pair of adjacent cushion members fixed with respect to said frame, the free ends of said springs projecting between said cushion members, contacting both of them and being movably held therebetween.

2. In combination with a vehicle frame, a wheel, a fork, a caster mounting for said fork trunnioned in bearings, fixed with respect to said vehicle, friction means in said caster mounting to resist rotation of the fork with respect to the caster mounting, yielding means for resisting tilting movement of said trunnioned caster mounting equally, irrespective of the direction of movement of the vehicle, said means comprising a longitudinally aligned leaf spring attached to said caster at one end and bearing upon a support at its other end, said fork positioned below said fixed bearings whereby a substantial part of the load carried is exerted directly through said bearings and kept from said yielding means, said spring lying between the plane defined by the upper and lower surfaces of said frame.

3. In combination in a trailer vehicle, a frame, an extended plate member pivoted therein for movement about a fixed, generally horizontal axis, a movable fork depending therefrom, a wheel supported for rotation in said fork, a caster mounting for said fork carried by said plate, friction means in said caster mounting adapted to resist rotation of the fork with respect to the caster mounting, a leaf spring secured at one end to said plate, projecting longitudinally therefrom with respect to said frame, in general alignment with said frame, said spring and said plate positioned substantially between the planes defined by the upper and lower margins of said frame, said spring at its outer end being supported upon said frame by a movable connection, the plane of the top or upper margin of said frame defining the top of said trailer as a whole.

LESTER WACHTER.